United States Patent
Urabayashi et al.

(10) Patent No.: US 11,032,030 B2
(45) Date of Patent: Jun. 8, 2021

(54) USER EQUIPMENT AND METHOD

(71) Applicant: KYOCERA Corporation, Kyoto (JP)

(72) Inventors: Hiroyuki Urabayashi, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 8 days.

(21) Appl. No.: 16/525,940

(22) Filed: Jul. 30, 2019

(65) Prior Publication Data

US 2019/0356424 A1 Nov. 21, 2019

Related U.S. Application Data

(63) Continuation of application No. PCT/JP2018/002139, filed on Jan. 24, 2018.

(30) Foreign Application Priority Data

Feb. 3, 2017 (JP) .............................. JP2017-018611

(51) Int. Cl.
*H04L 1/18* (2006.01)
*H04L 5/00* (2006.01)
*H04W 72/04* (2009.01)

(52) U.S. Cl.
CPC .......... *H04L 1/1819* (2013.01); *H04L 5/0055* (2013.01); *H04L 5/0082* (2013.01); *H04W 72/042* (2013.01); *H04W 72/0446* (2013.01)

(58) Field of Classification Search
CPC ... H04L 1/1819; H04L 1/1854; H04L 5/0023; H04L 5/0055; H04L 5/0082; H04L 5/0094; H04W 72/042; H04W 72/0446
See application file for complete search history.

(56) References Cited

U.S. PATENT DOCUMENTS

2015/0078307 A1 3/2015 Ohta
2016/0219560 A1* 7/2016 Chen ................. H04W 72/0446
(Continued)

FOREIGN PATENT DOCUMENTS

WO 2013/179401 A1 12/2013

OTHER PUBLICATIONS

3rd Generation Partnership Project;Technical Specification Group Radio Access Network; Evolved Universal Terrestrial Radio Access (E-UTRA) and Evolved Universal Terrestrial Radio Access Network(E-UTRAN); Overall description; Stage 2 (Release 14); 3GPP TS 36.300 V14.1.0; Dec. 2016; pp. 1-317, Valbonne, France.
(Continued)

*Primary Examiner* — Kashif Siddiqui
(74) *Attorney, Agent, or Firm* — Studebaker & Brackett PC

(57) ABSTRACT

A user equipment according to an embodiment comprises a processor and a memory coupled to the processor. The processor is configured to receive a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe. The processor is configured to attempt to receive a second data transmitted on a second PDSCH in which a transmission time interval is one subframe. The processor is configured to transmit a second HARQ-ACK corresponding to the second data on the first time region.

4 Claims, 15 Drawing Sheets

(56) References Cited

U.S. PATENT DOCUMENTS

2017/0064706 A1* 3/2017 Patel ................ H04W 28/0236
2018/0077719 A1* 3/2018 Nory ................ H04W 28/0278

OTHER PUBLICATIONS

Interdigital Communications, on sPDCCH Design, 3GPP TSG-RAN WGI Meeting #86bis, RI-1610096, Oct. 10-14, 2016, section 2, Lisbon, Portugal.
NTT DOCOMO, Inc., s(E)PDCCH for shortened TTI, 3GPP TSG RAN WGI Meeting #87, RI-1612694, Nov. 14-18, 2016, section 3.2, Reno, Nevada, USA.
Panasonic, Discussion on single level DCI and two-level DCI, 3GPP TSG RAN WGI, Meeting #87, RI-1612109, Nov. 14-18, 2016, section 2, Reno, Nevada, USA.
Huawei, Hisilicon, Discussion on sTTI scheduling schemes, 3GPP TSG RAN WGI, Meeting #87, RI-1613028, Nov. 14-18, 2016, sections 2, 3, Reno, Nevada, USA.
Ericsson, Handling overlapping allocations with short and 1 ms TTI, 3GPP TSG-RAN WG1 #87, R1-1611514, Nov. 14-18, 2016, 4pages, Reno, USA.
Sierra Wireless, Ack Bundling Design Considerations, 3GPP TSG RAN WG1 Meeting #86, R1-166680, Aug. 22-26, 2016, 6pages, Gothenburg, Sweden.

* cited by examiner

USER EQUIPMENT AND METHOD

RELATED APPLICATION

This application is a continuation application of international application PCT/JP2018/002139, filed Jan. 24, 2018, which claims the benefit of Japanese Patent Application No. 2017-018611 (filed on Feb. 3, 2017), the entire contents of which are incorporated herein by reference.

TECHNICAL FIELD

The present disclosure relates to a user equipment and a method.

BACKGROUND

In an LTE (Long Term Evolution) system designed in 3GPP (3rd Generation Partnership Project) which is a project aiming to standardize a mobile communication system, a physical downlink shared channel (PDSCH: Physical Downlink Shared CHannel) is used to transmit data from a base station to a user terminal.

In recent years, to reduce a delay time of downlink data, specification of a short physical downlink shared channel (sPDCCH: short-PDCCH) of which a transmission time interval is shorter than that of the physical downlink shared channel has been in progress. The short physical downlink shared channel can be used to reduce data transmission delay.

SUMMARY

A user equipment according to an embodiment comprises a processor and a memory coupled to the processor. The processor is configured to receive a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe. The processor is configured to attempt to receive a second data transmitted on a second PDSCH in which a transmission time interval is one subframe. The processor is configured to transmit a second HARQ-ACK corresponding to the second data on the first time region.

A method according to an embodiment is used for a user equipment. The method comprises receiving a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe; attempting to receive a second data transmitted on a second PDSCH in which a transmission time interval is one subframe; and transmitting a second HARQ-ACK corresponding to the second data on the first time region.

An apparatus according to an embodiment controls a user equipment. The apparatus comprises a processor and a memory coupled to the processor. The processor is configured to execute processes of: receiving a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe; attempting to receive a second data transmitted on a second PDSCH in which a transmission time interval is one subframe; and transmitting a second HARQ-ACK corresponding to the second data on the first time region.

DESCRIPTION OF THE EMBODIMENT

Overview of Embodiments

Figure 1:
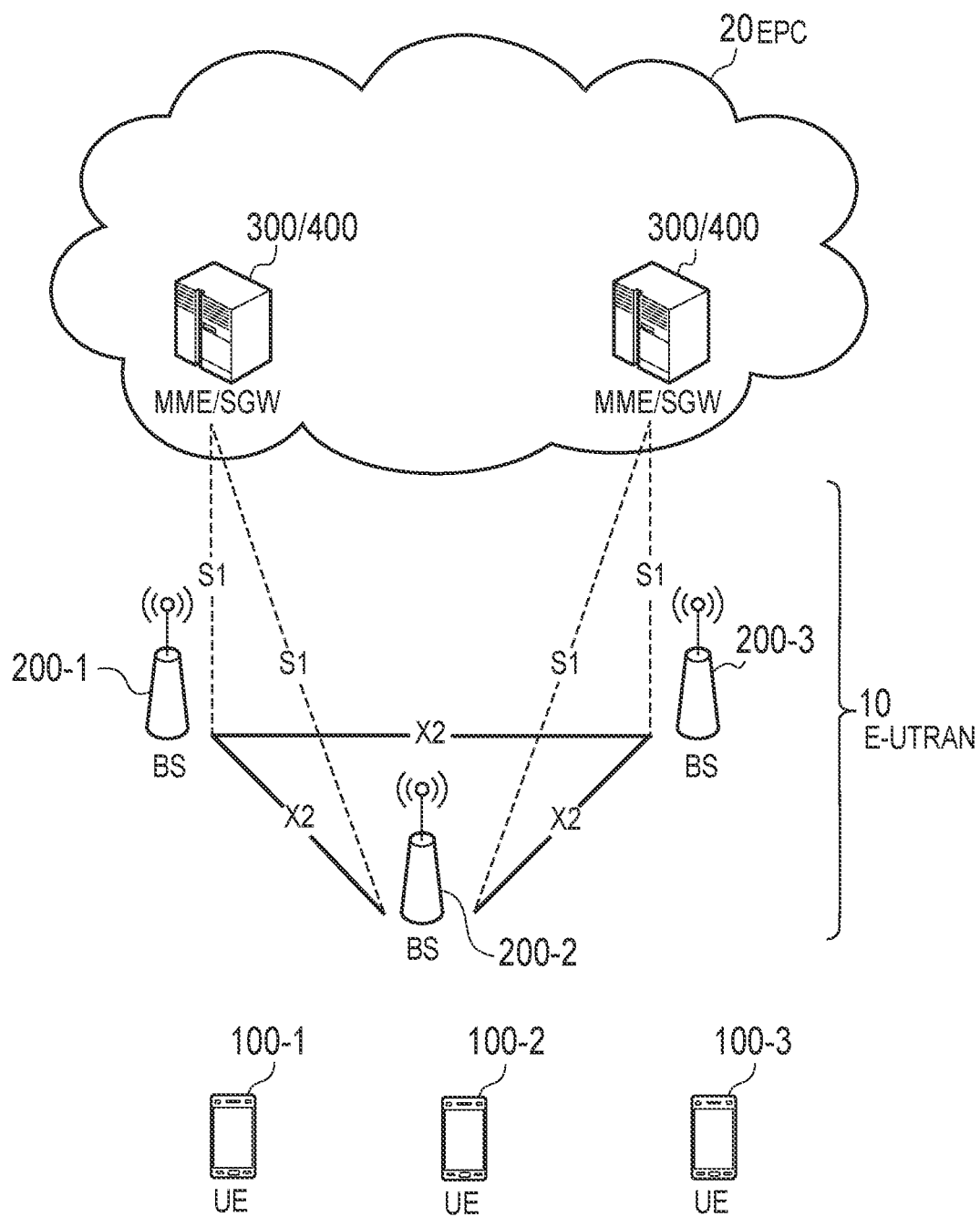
FIG. 1 is a diagram illustrating a configuration of a mobile communication system.

A first radio communication device according to one embodiment comprises a controller. The controller is configured to attempt to receive first information transmitted from a second radio communication device over a first physical channel. The controller is configured to attempt to receive second information transmitted from the second radio communication device over a second physical channel whose transmission time interval is shorter than that of the first physical channel. The controller is configured to collectively notify the second radio communication device of a first result as to whether to request retransmission of the first information and a second result as to whether to request retransmission of the second information.

The controller may be configured to receive control information from the second radio communication device.

The control information may designate a timing at which the first result and the second result are collectively notified.

The controller may be configured to receive control information from the second radio communication device. The control information may specify a combination of a reception timing of the first information and a reception timing of the second information.

The controller may be configured to receive control information from the second radio communication device. The control information may specify an order of the first result and the second result obtained when the first result and the second result are notified.

A first radio communication device according to one embodiment comprises a controller. The controller is configured to control monitoring of a control region, a data region, a short control region, and a short data region. The short control region is arranged at a time interval shorter than the control region. The short data region is arranged at a time interval shorter than the data region. The controller is configured to receive, from a second radio communication device, control information to be used to determine whether to monitor the short control region; and determine whether to monitor the short control region, based on the control information. The control information is used to determine whether to monitor some short control regions, out of a plurality of short control regions arranged from a first control region to a second control region arranged next to the first control region.

The control information may indicate at least one of some short control regions to be monitored, a short control region to be started to be monitored, and a period including the some short control regions to be monitored.

The control information may be short control information to be used to specify a time-frequency resource to be used for transmitting data in the short data region.

The controller may be configured to determine whether to monitor the short control region, based on a size of the short control information.

The controller may be configured to receive information indicating a threshold value from the second radio communication device; and determine whether to monitor the short control region by comparing the size of the short control information with the threshold value.

The controller may be configured to start a timer for determining whether to monitor the short control region; and execute monitoring of some short control regions until the timer expires even if the controller determines not to monitor the short control regions, based on the control information.

A first radio communication device according to one embodiment comprises a controller. The controller is configured to control monitoring of a control region, a data region, a short control region, and a short data region. The short control region is arranged at a time interval shorter than the control region. The short data region is arranged at a time interval shorter than the data region. The controller starts a timer for determining whether to monitor the short control region in response to execution of communication with a second radio communication device. The controller executes monitoring of the short control region while the timer is activated. The controller ends the monitoring of the short control region in response to expiration of the timer.

The controller may be configured to start the timer in response to transmitting a scheduling request to the second radio communication device.

The controller may be configured to start the timer in response to transmitting information in a short data region in an uplink.

The controller may be configured to start the timer in response to receiving information in a short data region in a downlink.

Embodiments (Mobile Communication System)

The configuration of the mobile communication system according to the embodiment will be described. FIG. 1 is a diagram illustrating the configuration of a mobile communication system. An LTE system will be described as an example of the mobile communication system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a radio communication apparatus (radio terminal). The UE 100 is a mobile communication apparatus. The UE 100 performs radio communication with a cell (later described BS 200). The configuration of the UE 100 will be described later.

The E-UTRAN 10 corresponds to a radio access network. The E-UTRAN 10 includes a BS (BASE STATION) 200. The BS 200 corresponds to a base station. The BS 200 is, for example, an eNB 200 (evolved Node-B). The BS 200 may be a node capable of performing radio communication with the UE 100. For example, the BS 200 may be gNB (next Generation Node-B). The BSs 200 may be connected to each other via an X2 interface. The configuration of the BS 200 will be described later.

The BS 200 manages one or a plurality of cells. The BS 200 performs radio communication with the UE 100 that has established connection with cells managed by the BS 200. The BS 200 has a radio resource management (RRM) function, a routing function of user data (hereinafter, simply referred to as "data"), a measurement control function for mobility control and scheduling, and the like.

The "cell" may be used as a term indicating the minimum unit of a radio communication area. The "cell" may be used as a term indicating a function of performing radio communication with the UE 100. The "cell" may be a downlink resource, or may be a combination of downlink resource and uplink resource. A link between a carrier frequency of the downlink resource and a carrier frequency of the uplink resource may be included in system information transmitted on the downlink resource.

The EPC 20 corresponds to a core network. The EPC 20 may constitute a network together with the E-UTRAN 10. The EPC 20 includes an MME (Mobility Management Entity) 300 and an SGW (Serving Gateway) 400.

The MME 300 performs, for example, various kinds of mobility control for the UE 100. The SGW 400 performs, for example, data transfer control. The MME 300 and the SGW 400 are connected to the BS 200 via a S1 interface.

Figure 2:
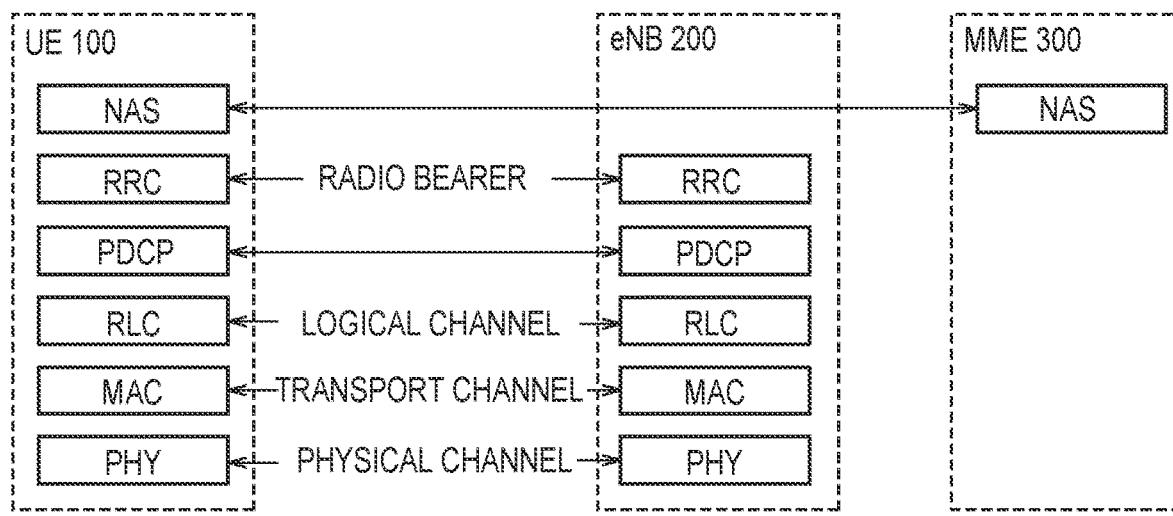
FIG. 2 is a protocol stack diagram of a radio interface.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the BS 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the BS 200, data and control signal are transferred via a transport channel. The MAC layer of the BS 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the BS 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the BS 200, messages (RRC messages) for various configurations are transferred. The RRC layer controls the logical channel, the transport channel, and the physical channel in response to establishment, reestablishment, and release of a radio bearer. If there is connection (RRC connection) between the RRC of the UE 100 and the RRC of the BS 200, the UE 100 is in an RRC connected state. If there is not a connection (RRC connection) between the RRC of the UE 100 and the RRC of the BS 200, the UE 100 is in an RRC idle state.

A non-access stratum (NAS) layer located above the RRC layer performs, for example, session management, mobility management, and the like.

Figure 3:
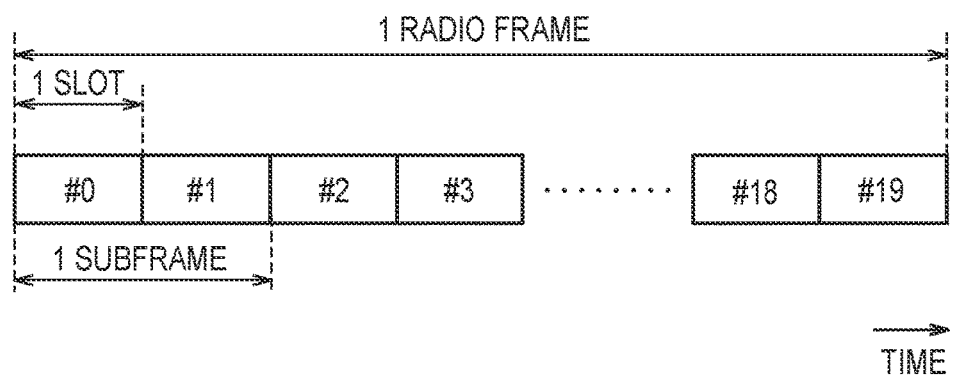
FIG. 3 is a diagram illustrating a configuration of a radio frame.

FIG. 3 is a configuration diagram of a radio frame. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier.

In the downlink, the section of the first several symbols of each subframe is a control region that can be mainly used as a physical downlink control channel (PDCCH) for transmitting a downlink control signal. The remaining part of each subframe is a region that can mainly be used as a physical downlink shared channel (PDSCH) for transmitting downlink data. In the downlink, reference signals such as cell-specific reference signals are distributed and arranged in each subframe.

In the uplink, both end portions in the frequency direction in each subframe are control regions mainly usable as a Physical Uplink Control Channel (PUCCH) for transmitting an uplink control signal. The remaining part of each subframe is a region that can be mainly used as a physical uplink shared channel (PUSCH) for transmitting uplink data.

(Physical Channel)

The physical downlink control channel (PDCCH) is used to carry downlink control information. The PDCCH may notify the UE 100 of resource allocation information on the PDSCH (downlink shared channel (DL-SCH) and a paging channel (PCH)) and HARQ information (ACK/NACK) on the DL-SCH. The PDCCH may carry an uplink scheduling grant. The PDCCH may carry a sidelink scheduling grant.

The physical downlink shared channel (PDSCH) is used to carry user data and control information. The PDSCH may carry the DL-SCH and the PCH.

A short physical downlink control channel (sPDCCH: short PDCCH) is used to carry control information. The sPDCCH may carry the same type of information as the PDCCH. The control information is, for example, short downlink control information (sDCI: short Downlink Control Information) described later. The sPDCCH may have a shorter transmission time interval (TTI: Transmission Time Interval) than the PDCCH.

While the PDCCH is transmitted across an entire system band, the sPDCCH may not be transmitted across the entire system band. The sPDCCH may be transmitted in a part of the system band.

A short physical downlink shared channel (sPDSCH: short PDSCH) is used to carry user data and control information. The sPDSCH may carry the same type of information as the PDSCH. The sPDSCH may have a shorter TTI than the PDSCH.

Figure 4:
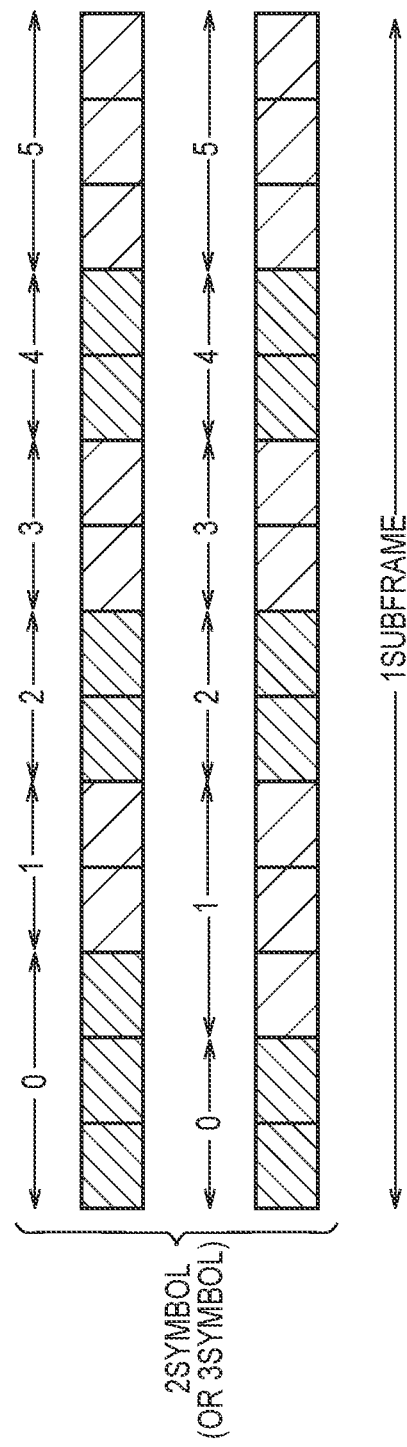
FIG. 4 is a diagram for describing sPDSCH.

The TTI of the PDSCH (and the PDCCH) is one subframe. On the other hand, the transmission time interval (sTTI) of the sPDSCH (and the sPDCCH) may be, for example, seven symbols (one slot). In this case, one subframe is represented by two sTTIs. The sTTI of the sPDSCH (and the sPDCCH) may be two symbols or three symbols (see FIG. 4). In this case, one subframe is represented by the six sTTIs.

A physical uplink control channel (PUCCH) is used to carry control information. The PUCCH may carry HARQ information (ACK (Acknowledgement)/NACK (Negative Acknowledgment)) that responds to downlink transmission. The PUCCH may carry a scheduling request (SR). The PUCCH may carry a CSI (Channel State Information) report.

A physical uplink shared channel (PUSCH) is used to carry user data and control information. The PUSCH may carry an uplink shared channel (UL-SCH).

A short physical uplink control channel (sPUCCH: short PUCCH) is used to carry control information. The sPUCCH may carry the same type of information as the PUCCH. The sPUCCH may have a shorter TTI than the PUCCH.

A short physical uplink shared channel (sPUSCH: short PUSCH) is used to carry user data and control information. The sPUSCH may carry the same type of information as the PUSCH. The sPUSCH may have a shorter TTI than the PUSCH.

Figure 5:
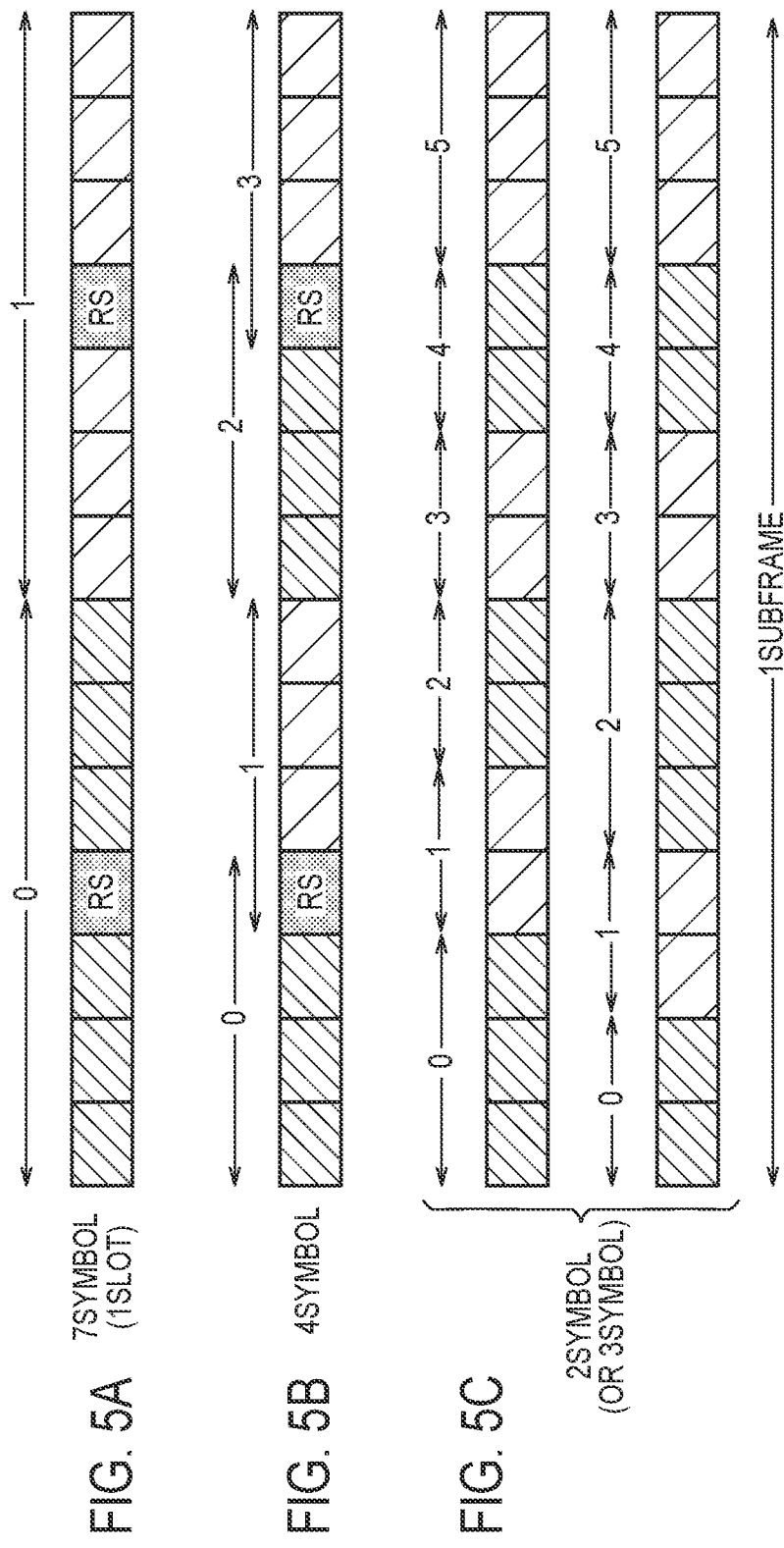
FIG. 5A, FIG. 5B, and FIG. 5C are diagrams for describing sPUSCH.

The TTI of the PUSCH (and the PUCCH) is one subframe. On the other hand, the transmission time interval (sTTI) of the sPUSCH (and the sPUCCH) may be, for example, seven symbols (one slot) (see FIG. 5(A)). In this case, one subframe is represented by two sTTIs. The sTTI of the sPUSCH (and the sPUCCH) may be four symbols (see FIG. 5(B)). In this case, one subframe is represented by the four sTTIs. The sTTI of the sPUSCH (and the sPUCCH) may be two symbols or three symbols (see FIG. 5C). In this case, one subframe is represented by the six sTTIs.

The fourth symbol from the head of each slot may be a symbol for transmitting a demodulation reference signal (DMRS). If one subframe is represented by the four sTTIs, the DMRS is shared between two transmission time intervals (sTTIs).

If a downlink sTTI is comprised of seven symbols, an uplink sTTI may be comprised of seven symbols. If the downlink sTTI is comprised of two symbols (or three symbols), the uplink sTTI may be comprised of two symbols (or three symbols). If the downlink sTTI is comprised of two symbols (or three symbols), the uplink sTTI may be comprised of seven symbols. A combination of the downlink sTTI and the uplink sTTI may be a combination of other symbols.

The UE 100 (controller) is configured to control monitoring of the PUCCH, the PUSCH, the sPUCCH, and the sPUSCH.

(Short Downlink Control Information)

An example of the short downlink control information (sDCI: shortDCI) will be described with reference to FIG. 6 to FIG. 9. FIG. 6 to FIG. 9 are diagrams for describing an example of the short downlink control information.

A region where the PDCCH is transmitted is a control region (hereinafter, a PDCCH region). A region where the PDSCH is transmitted is a data region (hereinafter, a PDSCH region). A region where the sPDCCH is transmitted is a short control region (hereinafter, an sPDCCH region). A region where the sPDSCH is transmitted is a short data region (hereinafter, an sPDSCH region).

The sPDCCH regions are arranged at a time interval shorter than the PDCCH region. As a result, the transmission time interval of the sPDCCH is shorter than the transmission time interval of the PDCCH. In a time direction, a plurality of sPDCCH regions are arranged from a first PDCCH region to a second PDCCH region arranged next to the first PDCCH region.

The sPDSCH region is arranged at a time interval shorter than the PDSCH region. As a result, the transmission time interval of the sPDSCH is shorter than the transmission time interval of the PDSCH. Similarly to the sPDCCH region, in the time direction, a plurality of sPDSCH regions are arranged from the first PDCCH region to the second PDCCH region. A width of the sPDSCH region in the time direction may be the same as that of the sTTI.

The sPDCCH region may overlap with the PDCCH region (for a legacy UE). A first one of the sPDCCH regions in one subframe may overlap with the PDCCH region. The sPDCCH region and the sPDSCH region may overlap with the PDSCH region (for a legacy UE). Second and subsequent sPDCCH regions in one subframe may overlap with the PDSCH region.

In the sPDCCH region, the short downlink control information (sDCI) is transmitted via the sPDCCH. The sDCI is used to specify a time-frequency resource with which information (user data and/or control information) is transmitted in the short data region (sPDSCH region). The sDCI can include information (resource allocation information) for specifying the time-frequency resource in the sPDSCH region. The resource allocation information is information indicating the time and/or frequency resource. The sDCI may include scheduling information including the resource allocation information. The "time-frequency resource" may be a region (time and/or frequency region) of a space which the UE 100 should search to receive the sPDSCH.

The sDCI (or scheduling information) may include other information. For example, the sDCI (or the scheduling information) may include at least any of MCS information, RV (Redundancy Version) information, HARQ ID information, and DCI format information. If the BS 200 notifies the UE 100 of the other information, the BS 200 may not need to include the resource allocation information into the sDCI (or the scheduling information). That is, the sDCI (or the scheduling information) may include only the other information other than the resource allocation information. Even in a case where the sDCI does not specify the time-frequency resource, an operation described later may be performed.

The sDCI may be information specific to a UE (UE specific). For example, the sDCI may be information for a predetermined UE among UEs 100 in a cell. The sDCI may be information common to UEs (non-UE specific). For example, the sDCI may be information for all the UEs in the cell.

An example of a method of transmitting sDCI will be described below. Each case may be combined as appropriate. The same content will not be described.

(A) First Case

Figure 6:
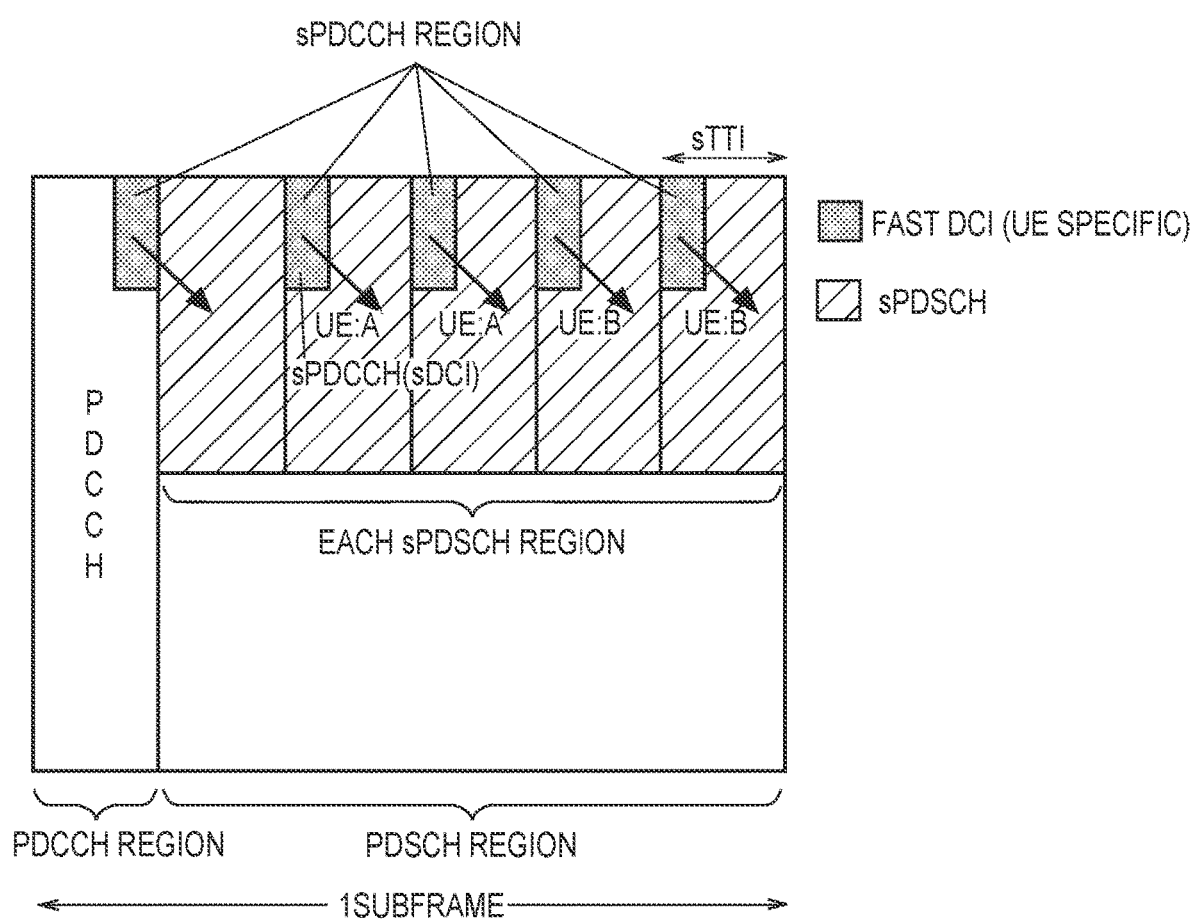
FIG. 6 is a diagram for describing an example of sDCI.

As illustrated in FIG. 6, the sDCI may be first sDCI (Fast DCI) for specifying the time-frequency resource in a predetermined sPDSCH region corresponding to a predetermined sPDCCH region.

For example, the first one of the sPDCCH regions and the first one of the sPDSCH regions are associated. A second one of the sPDCCH regions arranged after the first one of the sPDCCHs regions and a second one of the sPDSCH regions arranged immediately after the first one of the sPDSCH regions are associated. The same applies to the other sPDCCH regions and the other sPDSCH regions. The second and subsequent sPDCCH regions may overlap with the corresponding sPDSCH regions in the time direction. The first one of the sPDCCH regions may not need to overlap with the corresponding sPDSCH region in the time direction.

The first sDCI transmitted via the sPDCCH in the first sPDCCH region indicates the time-frequency resource of information transmitted via the sPDSCH in the first sPDSCH region. Likewise, the first sDCI transmitted via the sPDCCH in the second sPDCCH region indicates the time-frequency resource of information transmitted via the sPDSCH in the second sPDSCH region.

The first sDCI may be transmitted in the PDCCH region. In this case, the first sDCI may be transmitted via the sPDCCH. The first sDCI may be transmitted via the PDCCH.

The first sDCI may be UE-specific information. For example, the first sDCI transmitted to a UE A via the sPDCCH in the second (and third) sPDCCH region(s) may indicate the time-frequency resource of information transmitted to the UE A via the sPDSCH in the second (and third) sPDSCH region(s). The first sDCI transmitted to a UE B via the sPDCCH in the fourth (and fifth) sPDCCH region(s) may indicate the time-frequency resource of information transmitted to the UE B via the sPDSCH in the fourth (and fifth) sPDSCH region(s).

(B) Second Case

Figure 7:
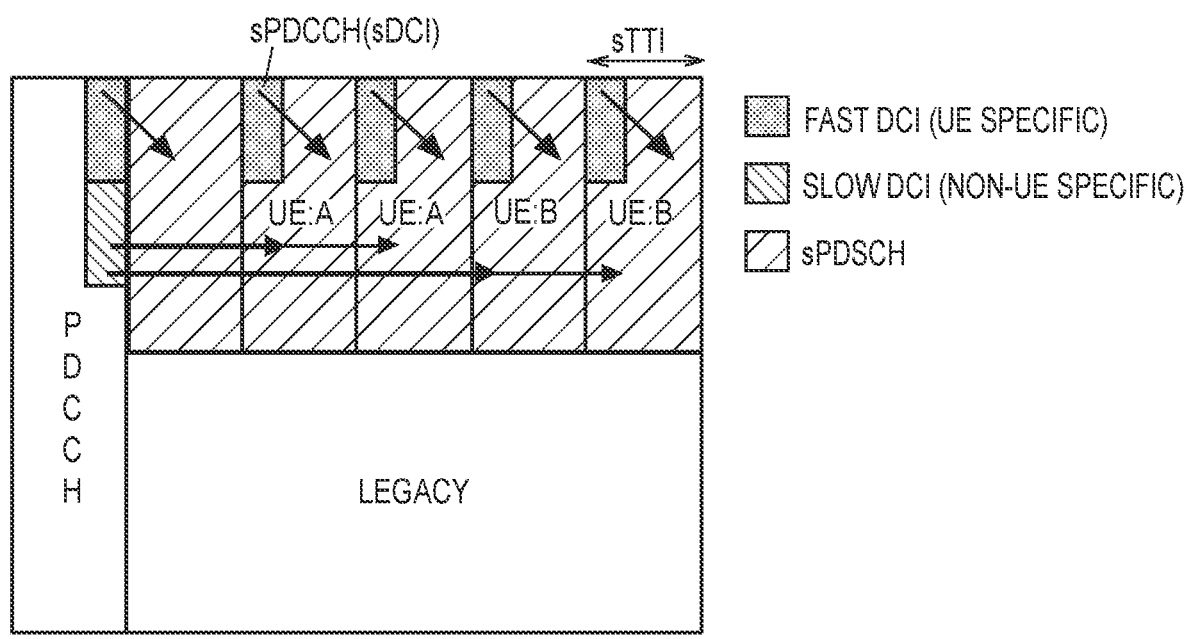
FIG. 7 is a diagram for describing an example of the sDCI.

As illustrated in FIG. 7, the sDCI may be second sDCI (Slow DCI) for specifying time-frequency resources in a plurality of sPDSCH regions.

The second sDCI may be transmitted only in the first one of the sPDCCH regions in one subframe. The sPDCCH region for transmitting the second sDCI may be different from the sPDCCH region for transmitting the first sDCI. The second sDCI may be transmitted only in the PDCCH region. In this case, the second sDCI may be transmitted via the sPDCCH. The second sDCI may be transmitted via the PDCCH.

The second sDCI may be information common to UEs. Therefore, the BS 200 configured to control each of a plurality of UEs 100 existing in a cell of the BS 200 may transmit, as the second sDCI, one piece of sDCI common to the UEs 100.

For example, the second sDCI may indicate the time-frequency resources of the sPDSCH (for example, the second and third sPDSCH regions) scheduled to be transmitted to a UE A, and the time-frequency resources of the sPDSCH (for example, the fourth and fifth sPDSCH regions) scheduled to be transmitted to a UE B.

The second sDCI may indicate a content of the first sDCI (scheduled to be transmitted at the time of generation of the second sDCI). The second sDCI may not need to indicate a content of the first one of the pieces of first sDCI. That is, the second sDCI may indicate a content of the first sDCI scheduled to be transmitted in each of the second and subsequent sPDSCH regions. The contents of the first sDCI may be resource allocation information. The content of the first sDCI may be scheduling information. The content of the first sDCI may be at least any of MCS information, RV (Redundancy Version) information, HARQ ID information, and DCI format information.

(C) Third Case

Figure 8:
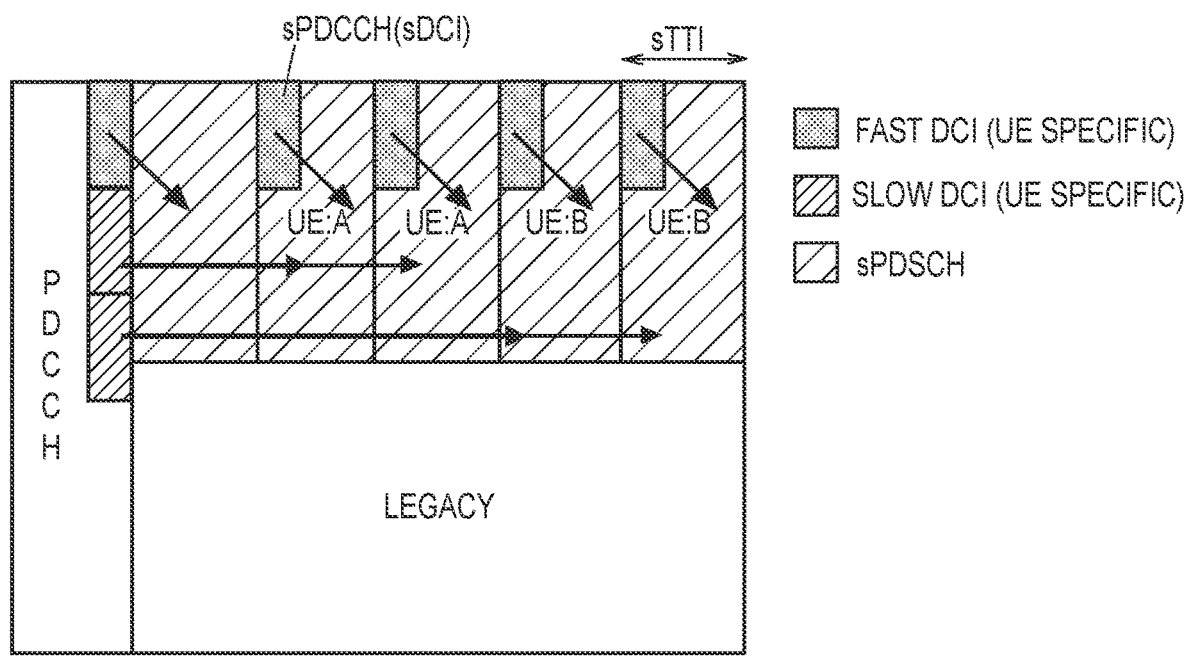
FIG. 8 is a diagram for describing an example of the sDCI.

As illustrated in FIG. 8, the second sDCI may be UE-specific information. Accordingly, the BS 200 may transmit a plurality of pieces of second sDCI to each UE 100 to receive each of the plurality of pieces of second sDCI.

For example, the second sDCI may indicate the time-frequency resources of the sPDSCH (for example, the second and third sPDSCH regions) scheduled to be transmitted only to a UE A. The second sDCI may indicate the time-frequency resources of the sPDSCH (for example, the fourth and fifth sPDSCH regions) scheduled to be transmitted only to a UE B. Therefore, the second sDCI may be control information addressed to a predetermined UE 100 among the plurality of UEs 100 in the cell.

(D) Fourth Case

Figure 9:
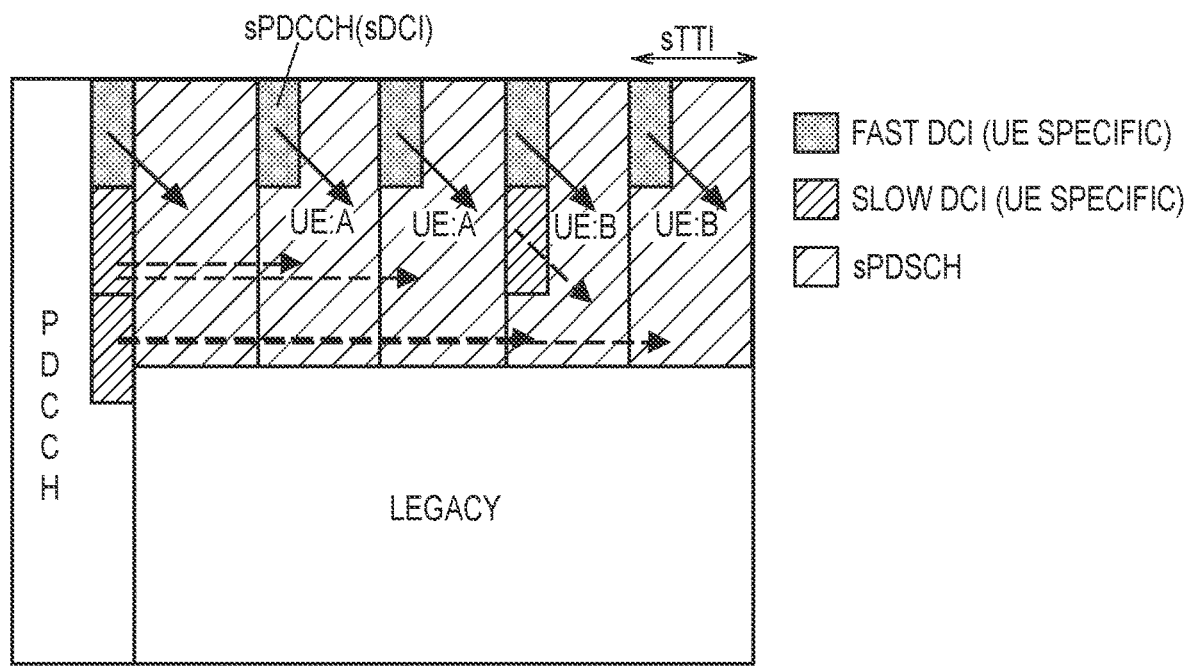
FIG. 9 is a diagram for describing an example of the sDCI.

As illustrated in FIG. 9, the second sDCI may not only be transmitted in the PDCCH region (or the first one of the sPDCCH regions), but may also be transmitted in an sPDCCH region behind the PDCCH region.

The second sDCI to be transmitted in an sPDCCH region behind the PDCCH region may indicate the time-frequency resource in a predetermined sPDSCH region corresponding to the predetermined sPDCCH region, as in the first sDCI. For example, the second sDCI to be transmitted in the fourth sPDCCH region may indicate the time-frequency resource of information to be transmitted in the fourth sPDSCH region.

(Radio Terminal)

Figure 10:
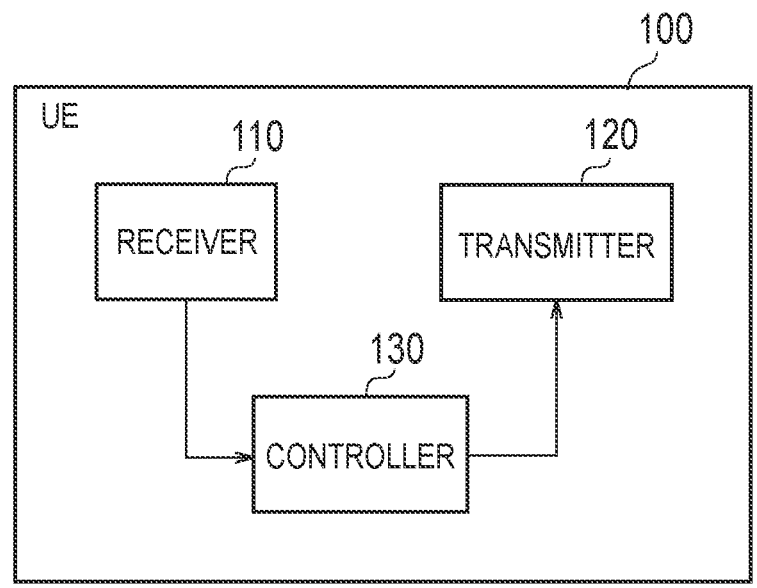
FIG. 10 is a block diagram of a UE 100.

The UE 100 (radio terminal) according to the embodiment will be described. FIG. 10 is a block diagram of the UE 100. As illustrated in FIG. 10, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

(Base Station)

Figure 11:
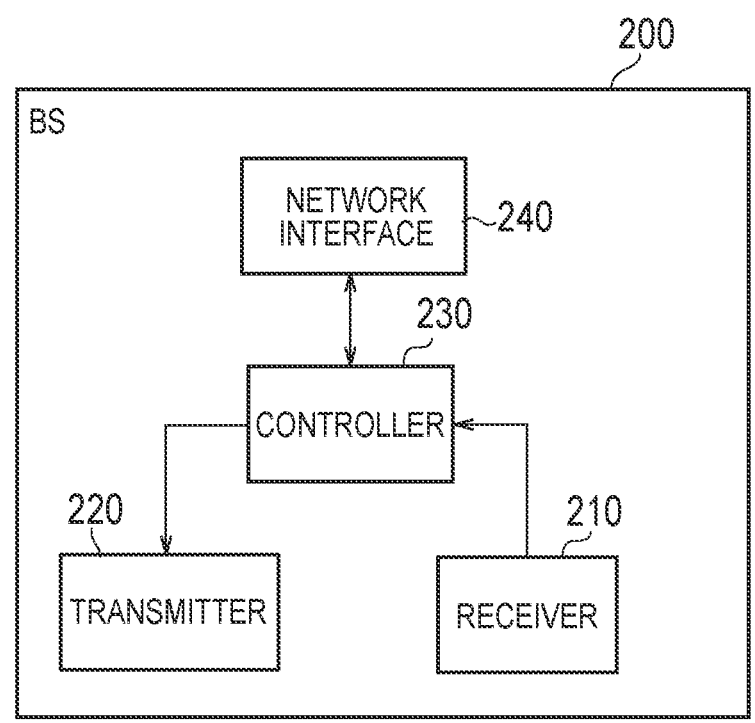
FIG. 11 is a block diagram of a BS 200.

The BS 200 (base station) according to the embodiment will be described. FIG. 11 is a block diagram of the BS 200. As illustrated in FIG. 11, the BS 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the BS 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour BS 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the BS 200 is described herein as a process (operation) executed by the BS 200.

First Embodiment

A first embodiment will be described. In the first embodiment, a first radio communication device (for example, the UE 100) can collectively notify a second radio communication device (for example, the BS 200) of results about retransmission requests in different physical channels.

(A) Operation Pattern 1-1

Figure 12:
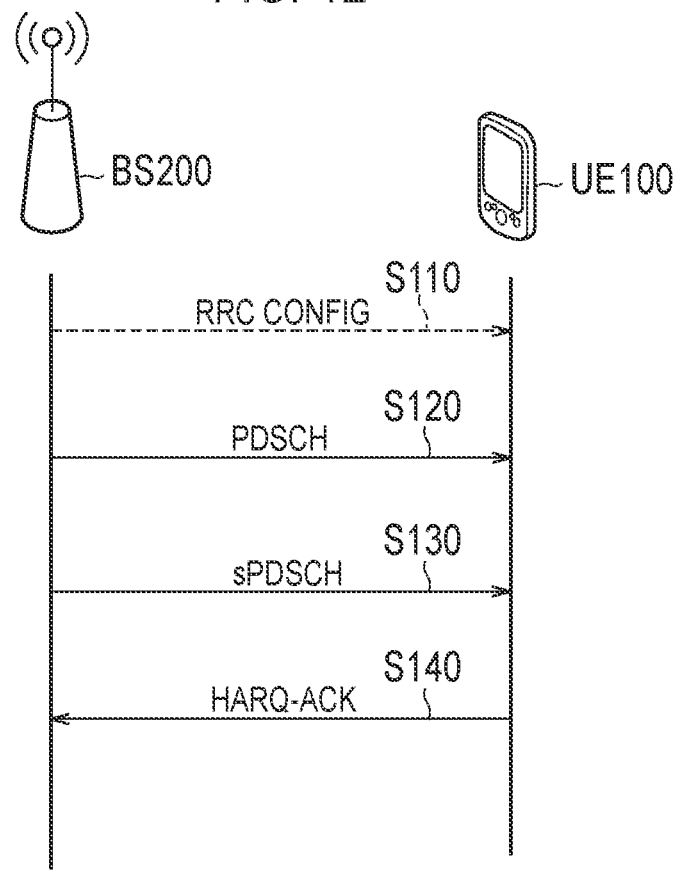
FIG. 12 is a sequence chart for describing an operation (operation pattern 1-1) according to a first embodiment.
Figure 13:
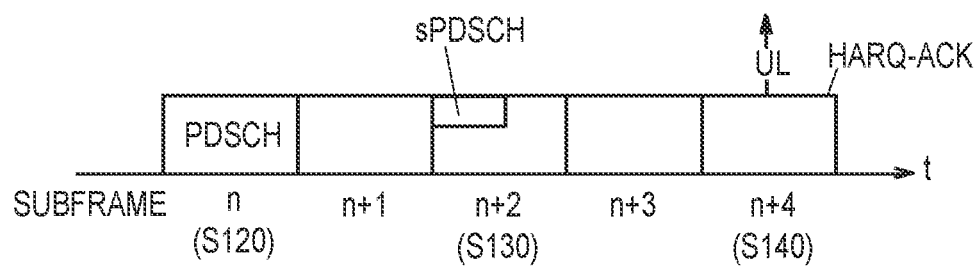
FIG. 13 is a diagram for describing the operation (operation pattern 1-1) according to the first embodiment.

An operation pattern 1-1 will be described with reference to FIG. 12 and FIG. 13. FIG. 12 is a sequence chart for describing an operation (operation pattern 1-1) according to the first embodiment. FIG. 13 is a diagram for describing the operation (operation pattern 1-1) according to the first embodiment.

As illustrated in FIG. 12, in step S110, the BS 200 may transmit control information to the UE 100. The UE 100 may receive the control information from the BS 200.

The BS 200 may transmit the control information to the UE 100 by dedicated signaling. For example, the BS 200 may transmit the control information, as RRC configuration information (RRC config), by an RRC message (for example, an RRC connection reestablishment message). The BS 200 may transmit the control information, as DCI, to the UE 100. The BS 200 may transmit the control information to the UE 100 by broadcast signaling (for example, an SIB (System Information Block))/group cast signaling.

A content of the control information will be described later.

In step S120, the BS 200 transmits first information to the UE 100 over the PDSCH. For example, as illustrated in FIG. 13, the BS 200 transmits the first information to the UE 100 via the PDSCH, in the PDSCH region in a subframe n. The UE 100 attempts to receive the first information transmitted over the PDSCH.

In step S130, the BS 200 transmits second information to the UE 100 over the sPDSCH. For example, as illustrated in FIG. 13, the BS 200 transmits the second information to UE 100 via the sPDSCH, in the sPDSCH region in a subframe n+2. The UE 100 attempts to receive the second information transmitted over the sPDSCH.

In step S140, the UE 100 collectively notifies the BS 200 of a first result as to whether to request retransmission of the first information and a second result as to whether to request retransmission of the second information. For example, as illustrated in FIG. 13, the UE 100 may collectively notify the BS 200 of the first result and the second result, in a subframe n+4.

The first result is a result indicating that retransmission of the information is not requested (ACK: Acknowledgement) or that the retransmission of the information is requested (NACK: Negative Acknowledgment). The second result is a result indicating that the retransmission of the information is not requested or that the retransmission of the information is requested. The information indicating the first result and the second result may be, for example, information (HARQ-ACK) to be used for a retransmission process by HARQ. The first result may be a reception result (first reception result) indicating that the reception of the first information has succeeded or failed. The second result may be a reception result (second reception result) indicating that the reception of the second information has succeeded or failed.

The UE 100 may multiplex first delivery confirmation information indicating the first result and second delivery confirmation information indicating the second result (Multiplexing). The first delivery confirmation information and the second delivery confirmation information may be distinguishable by attaching different codes. Alternatively, the UE 100 may include the first result and the second result as one datum, into one piece of delivery confirmation information.

The UE 100 can use the same time-frequency resource to transmit the delivery confirmation information (the first delivery confirmation information and the second delivery confirmation information) to the BS 200. As a result, the UE 100 can collectively notify the BS 200 of the first result and the second result.

The UE 100 may transmit the one piece of delivery confirmation information indicating the first result and the second result to the BS 200 (Bundling). Specifically, in response to a success in receiving both the first information and the second information, the UE 100 may transmit, to the BS 200, delivery confirmation information indicating ACK. In response to a failure to receive at least one piece of the first information and the second information, the UE 100 may transmit, to the BS 200, delivery confirmation information indicating NACK.

The UE 100 can transmit the delivery confirmation information to the BS 200 via any channel of the PUCCH, the PUSCH, the sPUCCH, and the sPUSCH. To reduce a delay, the UE 100 may transmit the delivery confirmation information to the BS 200 via any channel of the sPUCCH and the sPUSCH.

At present, a transmission timing (first transmission timing) of the delivery confirmation information of the PUSCH is four subframes (4 TTIs) after the reception of the PUSCH. On the other hand, if a transmission timing (second transmission timing) of the delivery confirmation information of the sPUSCH is, for example, x TTIs after the reception of the sPUSCH, when the first transmission timing matches the second transmission timing, the UE 100 may transmit the delivery confirmation information.

If the first transmission timing and the second transmission timing do not match, the UE 100 may transmit the delivery confirmation information at one of the transmission timings. The UE 100 may transmit the delivery confirmation information at the first transmission timing or the second transmission timing, whichever earlier. This can reduce the delay. The UE 100 may transmit the delivery confirmation information at the first transmission timing or the second transmission timing, whichever later. This operation is effective if preparation for transmission of the delivery confirmation information is not in time at the earlier transmission timing. If the first transmission timing and the second transmission timing do not match, the UE 100 may transmit the delivery confirmation information at a timing different from the first transmission timing and the second transmission timing. For example, the UE 100 may transmit the delivery confirmation information at a timepoint when the preparation for transmission of the delivery confirmation information is completed.

The UE 100 may transmit the delivery confirmation information to the BS 200, based on control information received from the BS 200. Below, an example of the control information is indicated. Each piece of control information may be combined.

The control information may specify a timing for notifying the delivery confirmation information. As a result, the UE 100 can determine a timing for notifying the delivery confirmation information, based on the control information.

For example, the control information may specify a subframe number in which the delivery confirmation information is to be transmitted (and/or not to be transmitted). The control information may be a bit string indicating the subframe number. The control information may indicate a literal value (for example, a subframe n+4) of the subframe number.

The control information may specify (a time interval of) an sPUCCH region and/or an sPUSCH region, as a timing at which the delivery confirmation information is to be transmitted (and/or not to be transmitted). For example, the control information may specify (a subframe number and) a slot number in which the sPUCCH region and/or the sPUSCH region is included. The control information may specify an index value (for example, an index value of the sTTI) indicating the sPUCCH region and/or the sPUSCH region. The index value may be indicated by a bit string.

The control information may specify a combination of a reception timing of the first information and a reception timing of the second information. As a result, the UE 100 can determine (the combination of) the first result and the second result that can be notified collectively, based on the control information.

For example, the UE 100 may have a list in which a combination of a reception timing of the PDSCH and a reception timing of the sPDSCH, and an index value are associated. The control information may be an index value of the list. The UE 100 may receive the list from the BS 200 by dedicated signaling and/or broadcast signaling.

The reception timing of the PDSCH may be indicated by the subframe number. The reception timing of the sPDSCH may be indicated by the subframe number (and/or an index value indicating the sPUSCH region). The reception timings of the PDSCH and the sPDSCH may be indicated by an offset value based on the transmission timing of the delivery confirmation information. For example, the reception timing of the PDSCH may indicate a subframe number preceding by n subframes from the transmission timing of the delivery confirmation information. The reception timing of the sPDSCH may indicate a subframe number (and/or an index value indicating the sPUSCH region) preceding by n−1 subframes from the transmission timing of the delivery confirmation information.

The control information may specify an order of the first result and the second result obtained when the first result and the second result are notified. As a result, the UE 100 can determine the order of the first result and the second result. The BS 200 can grasp the order of the first result and the second result included in the delivery confirmation information received from the UE 100.

For example, the control information may indicate that the first result is arranged before the second result. The control information may indicate that the second result is arranged before the first result. The control information may indicate that the earlier reception timing is arranged first. The control information may indicate that the later reception timing is arranged first.

Specifically, if the control information indicates that the first result is arranged before the second result, the UE 100 generates the delivery confirmation information so that the first result is arranged before the second result.

A case will be described where the UE 100 receives the PDSCH first and receives the sPDSCH later. If the control information indicates that the earlier reception timing is arranged first, the UE 100 generates the delivery confirmation information such that the first result about the first information received via the PDSCH at the earlier reception timing is arranged first. The UE 100 generates the delivery confirmation information such that the second result about the second information received via the sPDSCH at a reception timing later than the PDSCH is arranged after the first result.

The control information may indicate whether to permit collective notification of the first result and the second result. As a result, the UE 100 can determine whether to collectively notify the first result and the second result, based on the control information.

The UE 100 may execute a process of step S140 in response to the permission of the collective notification of the first result and the second result. In response to the refusal of the collective notification of the first result and the second result, the UE 100 may transmit, to the BS 200, the delivery confirmation information indicating the first result and the delivery confirmation information indicating the second result by using separate time-frequency resources.

The BS 200 may determine whether to permit the collective notification of the first result and the second result, according to a channel environment. For example, the BS 200 may permit the collective notification of the first result and the second result, in response to a radio environment between the UE 100 and the BS 200 being favorable (equal to or more than a threshold value). The BS 200 may permit the collective notification of the first result and the second result in response to the radio environment between the UE 100 and the BS 200 being unfavorable (less than the threshold value).

The radio environment between the UE 100 and the BS 200 may be a radio environment measured in the UE 100 (for example, a reception level (RSRP (Reference Signal Received Power) and/or RSRQ (Reference Signal Received Quality) of a radio signal from the BS 200 and/or another UE 100). The BS 200 may receive a measurement report of the radio environment from the UE 100. The radio environment between the UE 100 and the BS 200 may be a radio environment (for example, a reception level (RSRP and/or RSRQ) of a radio signal from the UE 100 and/or the other UE 100) measured in the BS 200.

Based on the delivery confirmation information from the UE 100, the BS 200 determines whether to execute a retransmission process by the HARQ.

If the first result indicates a reception failure (NACK), the BS 200 starts retransmission of the first information transmitted over the PDSCH. If the second result indicates a reception failure (NACK), the BS 200 starts retransmission of the second information transmitted over the sPDSCH. The BS 200 may retransmit the first information over the PDSCH or the sPDSCH. The BS 200 may retransmit the second information over the PDSCH or the sPDSCH.

If the first result indicates a reception success (ACK), the BS 200 omits retransmission of the first information transmitted over the PDSCH. If the second result indicates a reception success (ACK), the BS 200 omits retransmission of the second information transmitted over the sPDSCH.

A case will be described in which the BS 200 receives one piece of delivery confirmation information based on the Bundling. The BS 200 retransmits both the first information and the second information if the delivery confirmation information indicates a reception failure (NACK). The BS 200 may retransmit the first information and the second information over the PDSCH or the sPDSCH. The BS 200 omits the retransmission if the delivery confirmation information indicates a reception success (ACK).

As described above, the UE 100 collectively notifies the BS 200 of the results (the first result and the second result)

about the retransmission requests in the different physical channels. As a result, since the uplink radio resources to be used in a plurality of physical channels can be reduced, the uplink radio resources can be effectively utilized. The technology according to the present application is particularly effective in a communication system to which a TDD (Time Division Duplex) scheme with less uplink transmission timing is applied.

(B) Operation Pattern 1-2

Figure 14:
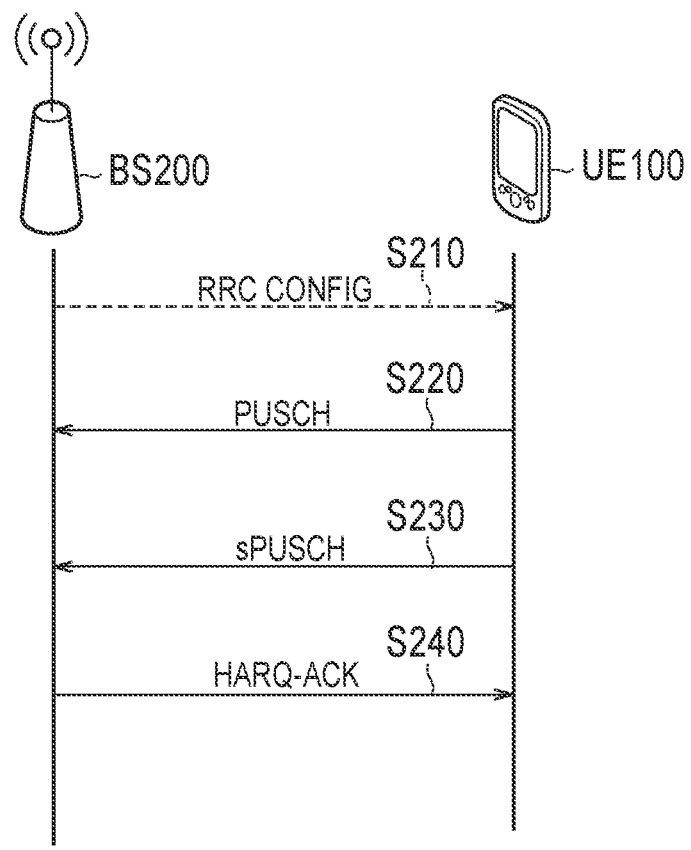
FIG. 14 is a sequence chart for describing an operation (operation pattern 1-2) according to the first embodiment.
Figure 15:
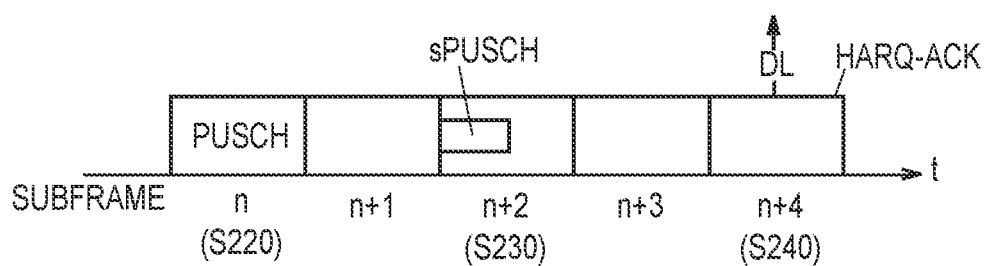
FIG. 15 is a diagram for describing the operation (operation pattern 1-2) according to the first embodiment.

An operation pattern 1-2 will be described with reference to FIG. 14 and FIG. 15. FIG. 14 is a sequence chart for describing an operation (operation pattern 1-2) according to the first embodiment. FIG. 15 is a diagram for describing the operation (operation pattern 1-2) according to the first embodiment. A content similar to the content described above will not be described.

The operation pattern 1-1 is a case where the delivery confirmation information for the downlink is transmitted. The operation pattern 1-2 is a case where the delivery confirmation information for the uplink is transmitted.

As illustrated in FIG. 14, in step S210, the BS 200 may transmit control information to the UE 100. The UE 100 may receive the control information from the BS 200.

Similarly to the above, the BS 200 may transmit the control information by dedicated signaling. The BS 200 may transmit the control information to the UE 100 by broadcast signaling/group cast signaling.

The control information may specify a timing at which the BS 200 collectively notifies the UE 100 of the results (delivery confirmation information) about the retransmission requests. A method of specifying the timing is the same as described above.

The control information may specify (a combination of) the results about the retransmission requests to be notified collectively. For example, the control information may be transmission resource allocation of the PUSCH and the sPUSCH, that is, time-frequency resources to be used to transmit the first information and the second information. The first information is information transmitted from the UE 100 to the BS 200 over the PUSCH. The second information is information transmitted from the UE 100 to the BS 200 over the sPUSCH. The control information may indicate that the results of the retransmission requests for the PUSCH (first information) and the sPUSCH (second information) transmitted using these time-frequency resources are collectively notified to the UE 100.

The control information may specify an order of the first result and the second result obtained when the first result and the second result are notified. Similarly to the above, the first result indicates whether to request the retransmission of the first information (ACK/NACK). The second result indicates whether to request the retransmission of the second information (ACK/NACK).

The control information may indicate whether to collectively notify the first result and the second result. Similarly to the above, the BS 200 may determine whether to collectively notify the first result and the second result, according to the channel environment.

In step S220, the UE 100 transmits the first information to the BS 200 over the PUSCH. For example, as illustrated in FIG. 15, the UE 100 transmits the first information to the BS 200 via the PUSCH, in the PUSCH region in a subframe n. The UE 100 may use the time-frequency resource specified by the control information to transmit the first information to the BS 200. The BS 200 attempts to receive the first information transmitted over the PUSCH.

In step S230, the UE 100 transmits the second information to the BS 200 over the sPUSCH. For example, as illustrated in FIG. 15, the UE 100 transmits the second information to the BS 200 via the sPUSCH, in the sPUSCH region in a subframe n+2. The UE 100 may use the time-frequency resource specified by the control information to transmit the second information to the BS 200. The BS 200 attempts to receive the second information transmitted over the sPDSCH.

In step S240, the BS 200 collectively notifies the UE 100 of the first result as to whether to request a retransmission of the first information and the second result as to whether to request a retransmission of the second information. For example, as illustrated in FIG. 15, the BS 200 may collectively notify the UE 100 of the first result and the second result in a subframe n+4.

The UE 100 may determine whether the BS 200 has collectively notified the first result and the second result, based on the control information. The UE 100 may determine the content of the delivery confirmation information (for example, which of the first result and the second result is arranged first), based on the control information.

The UE 100 determines, based on the delivery confirmation information from the BS 200, whether to execute a retransmission process by HARQ.

If the first result indicates a reception failure (NACK), the UE 100 starts retransmission of the first information transmitted over the PUSCH. If the second result indicates a reception failure (NACK), the UE 100 starts retransmission of the second information transmitted over the sPUSCH. The UE 100 may retransmit the first information over the PUSCH or the sPUSCH. The UE 100 may retransmit the second information over the PUSCH or the sPUSCH.

If the first result indicates a reception success (ACK), the UE 100 omits retransmission of the first information transmitted over the PUSCH. If the second result indicates a reception success (ACK), the UE 100 omits retransmission of the second information transmitted over the sPUSCH.

Thus, the BS 200 collectively notifies the UE 100 of the results (the first result and the second result) about the retransmission requests in the different physical channels. As a result, since the downlink radio resources to be used in a plurality of physical channels can be reduced, the downlink radio resources can be effectively utilized.

Second Embodiment

A second embodiment will be described. In the second embodiment, it is possible to determine whether the UE 100 monitors some sPDCCH regions (short control regions).

(A) Operation Pattern 2-1

Figure 16:
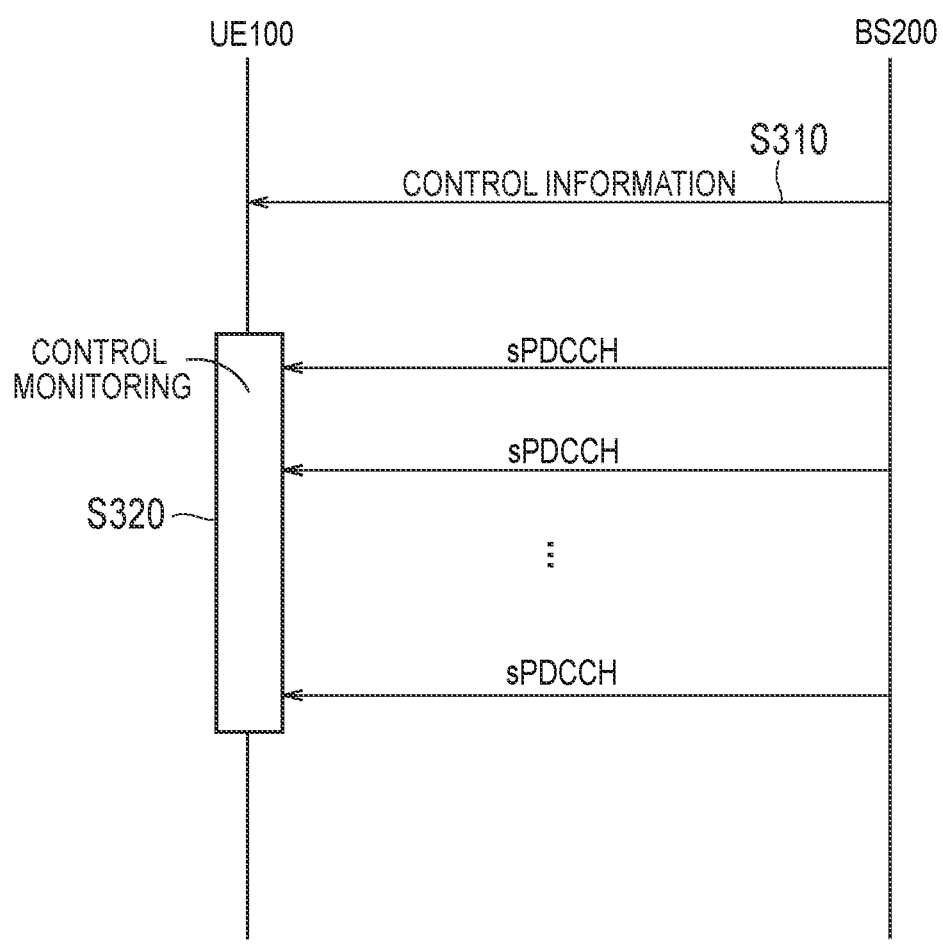
FIG. 16 is a sequence chart for describing an operation (operation pattern 2-1) according to a second embodiment.
Figure 17:
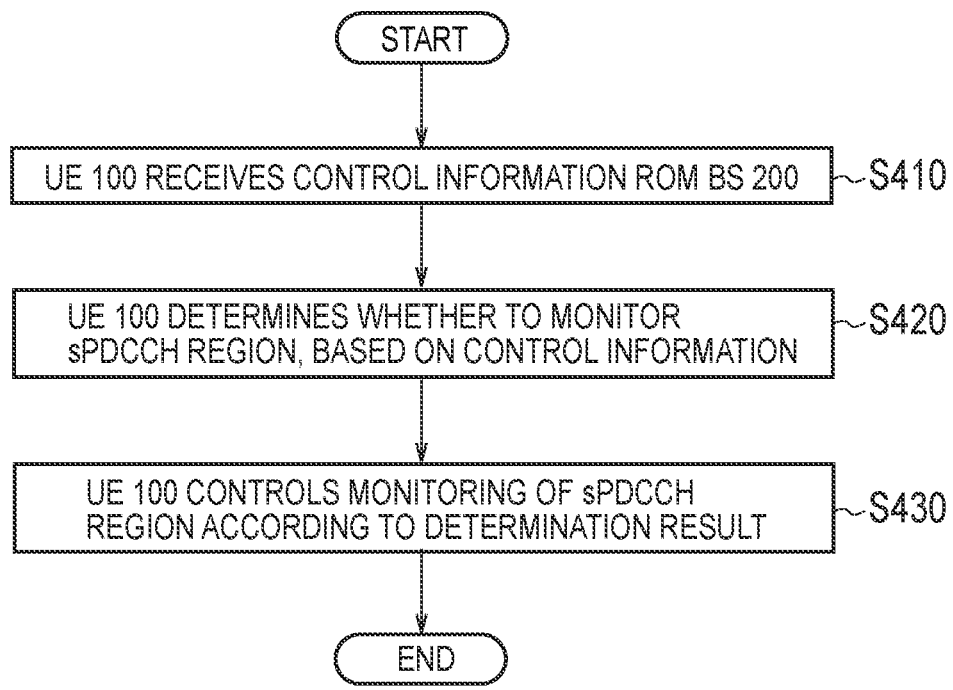
FIG. 17 is a flowchart for describing the operation (operation pattern 2-1) according to the second embodiment.
Figure 18:
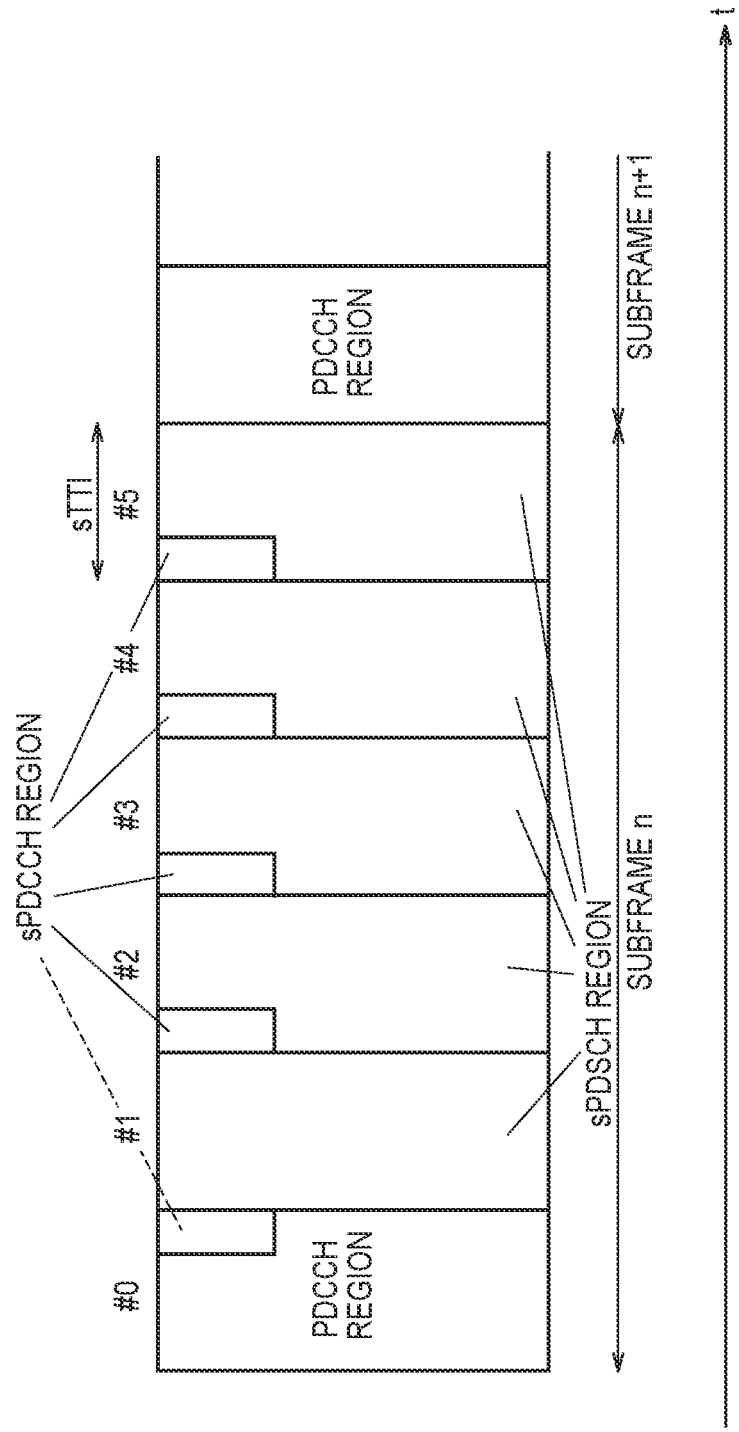
FIG. 18 is a diagram for describing the operation (operation pattern 2-1) according to the second embodiment.

An operation pattern 2-1 will be described with reference to FIG. 16 to FIG. 18. FIG. 16 is a sequence chart for describing an operation (operation pattern 2-1) according to the second embodiment. FIG. 17 is a flowchart for describing the operation (operation pattern 2-1) according to the second embodiment. FIG. 18 is a diagram for describing the operation (operation pattern 2-1) according to the second embodiment. A content similar to the content described above will not be described.

As illustrated in FIG. 16, in step S310, the BS 200 transmits the control information to the UE 100. Similarly to the above, the BS 200 may transmit the control information by dedicated signaling. The BS 200 may transmit the control information to the UE 100 by broadcast signaling/group cast signaling. The BS 200 may transmit the control information by an RRC message.

The BS 200 may use the time-frequency resource in the PDCCH region to transmit the control information over the PDCCH. The BS 200 may use the time-frequency resource in the sPDCCH region to transmit the control information over the sPDCCH. The BS 200 may include the control information into sDCI (first sDCI (Fast DCI) and/or second sDCI (Slow DCI)).

The control information may be applied individually to each UE 100 in the cell. The control information may be commonly applied to all the UEs 100 in the cell.

The control information in the second embodiment may be used to determine whether the UE 100 monitors the sPDCCH region. For example, the control information is used to determine whether to monitor some sPDCCH regions, from among a plurality of sPDCCH regions arranged from a first PDCCH to a second PDCCH arranged next to the first PDCCH.

The sPDCCH region used to determine whether the UE 100 monitors may be the first sPDCCH region where the first sDCI is transmitted. The sPDCCH region used to determine whether the UE 100 monitors may be the second sPDCCH region where the second sDCI is transmitted. The sPDCCH region used to determine whether the UE 100 monitors may be both the first sPDCCH region and the second sPDCCH region.

The UE 100 receives the control information from the BS 200 (S410 in FIG. 17). The UE 100 determines whether to monitor the sPDCCH region, based on the control information (S420 in FIG. 17). The UE 100 may receive a plurality of pieces of below-described control information from the BS 200. The UE 100 may determine whether to monitor the sPDCCH region, based on at least any of the plurality of pieces of control information.

An example of a method of determining whether the UE 100 monitors the sPDCCH region will be described.

The control information may indicate at least one of some sPDCCH regions to be monitored, an sPDCCH region to be started to be monitored, and a period including some sPDCCH regions to be monitored.

The control information may indicate some sPDCCH regions to be monitored in one subframe, with an index value of the sTTI. For example, in a case where the sTTI has two symbols, the control information may indicate a bit string indicating "{0, 0, 1, 0, 1, 1}". The UE 100 may determine to monitor the sPDCCH regions (#2, 4, 5) having index values of 2, 4, 5 of the sTTI.

The control information may indicate, in one subframe, the sPDCCH region to be started to be monitored, with an index value of the sTTI. The control information may indicate 3 of the index value of the sTTI. The UE 100 may determine to monitor the sPDCCH regions (#3, 4, 5) having index values of 3, 4, 5 of the sTTI.

The control information may indicate, with a slot number, a period in which some sPDCCH regions to be monitored are included in one subframe. For example, the control information may indicate a bit string having a slot number indicating "{0, 1}". The UE 100 may determine to monitor the sPDCCH regions (#3, 4, 5) included in the period having the slot number 1. If the control information indicates a bit string having a slot number indicating "{1, 0}", the UE 100 may determine to monitor the sPDCCH regions (#0, 1, 2). If the control information indicates a bit string having a slot number indicating "{1, 1}", the UE 100 may determine to monitor the sPDCCH regions (#0 to 5). If the control information indicates a bit string having a slot number indicating "{0, 0}", the UE 100 may determine to omit the monitoring of the sPDCCH region.

The control information may indicate at least one of some sPDCCH regions not to be monitored, an sPDCCH not to be started to be monitored, and a period including the some sPDCCH not to be monitored.

The control information may be an indication indicating a necessity to receive the first sDCI. The indication may indicate that the reception of the first sDCI is necessary. The indication may indicate that the reception of the first sDCI is not necessary. The indication may be included in the sDCI. The control information may be the sDCI (including the indication).

The UE 100 may determine not to monitor the sPDCCH region in response to the reception of the indication indicating that the reception of the first sDCI is not necessary. The UE 100 may determine to monitor the sPDCCH region in response to the reception of the indication indicating that the reception of the first sDCI is necessary.

For example, if a predefined default value is used as a value indicating each piece of information (for example, the MCS information) included in the first sDCI scheduled to be transmitted, the BS 200 may include the indication indicating that the reception of the first sDCI is not necessary, into the second sDCI. If the BS 200 uses a value different from the default value as the value indicating each piece of information included in the first sDCI scheduled to be transmitted, the BS 200 may include the indication indicating that the reception of the first sDCI is necessary, into the second sDCI. The BS 200 may include the indication indicating whether the default value is used in the first sDCI, into the second sDCI. The BS 200 may include the indication indicating whether the default value is used in the first sDCI, into the first sDCI. As a result, an amount of resources to be used for transmission of the first sDCI can be reduced.

The UE 100 may determine not to monitor the sPDCCH region in response to the reception of the indication indicating that the default value is used in the first sDCI. The UE 100 may determine to monitor the sPDCCH region in response to the reception of the indication indicating that the default value is not used in the first sDCI.

If including the same content as that of the first sDCI transmitted in the previous subframe into the next first sDCI scheduled to be transmitted, the BS 200 may include the indication indicating that the reception of the first sDCI is not necessary, into the second sDCI. If not updating the content (setting) of the first sDCI, the BS 200 may include the indication indicating that the reception of the first sDCI is not necessary, into the second sDCI. If including the content different from that of the first sDCI transmitted in the previous subframe, into the next first sDCI scheduled to be transmitted, the BS 200 may include the indication indicating that the reception of the first sDCI is necessary, into the second sDCI.

The BS 200 may include the indication indicating whether that the first sDCI is the same as the previous first sDCI, into the second sDCI. The UE 100 may determine not to monitor the sPDCCH region in response to the reception of the indication indicating that the first sDCI is the same as the previous first sDCI. The UE 100 may determine to monitor the sPDCCH region in response to the reception of the indication indicating that the first sDCI is different from the previous first sDCI.

The control information may be the sDCI. The UE 100 may determine whether to monitor the sPDCCH region, based on a size of the second sDCI. For example, the UE 100 may determine whether to monitor the sPDCCH region by comparing the size of the second sDCI with a threshold value (a first threshold value and/or a second threshold value).

The UE 100 may use the second sDCI to be transmitted over the sPDCCH in the sPDCCH region arranged after the PDCCH region. The UE 100 may use the second sDCI to be transmitted over the sPDCCH (or the PDCCH) in the PDCCH region.

The UE 100 may receive information on the threshold value (the first threshold value and/or the second threshold value) from the BS 200. The information on the threshold value may be included in the control information. The information on the threshold value may be included in an RRC message. The second threshold value is a value larger than the first threshold value.

The BS 200 may omit the transmission of the first sDCI if data can be sufficiently transmitted by the second sDCI (the second sDCI has an empty capacity). If the transmission of the first sDCI is omitted, the UE 100 can omit the monitoring of the sPDCCH region. The BS 200 may change the size of the second sDCI depending on whether the transmission of the first sDCI is necessary.

The UE 100 may determine not to monitor the sPDCCH region in response to the size of the second sDCI being smaller than the first threshold value. The UE 100 may determine to monitor the sPDCCH region in response to the second sDCI size being larger than the first threshold value. The UE 100 may determine to monitor the sPDCCH region in response to the size of the second sDCI being smaller than the second threshold value. The UE 100 may determine not to monitor the sPDCCH region in response to the size of the second sDCI being larger than the second threshold value.

The control information may indicate information included in the first sDCI and/or information included in the second sDCI. The control information may be a list of information included in the first sDCI and/or a list of information included in the second sDCI. Therefore, out of various types of information included in the normal DCI transmitted over the PDCCH, the BS 200 may include only a part of the information, rather than all the types of information, into the first sDCI and/or the second sDCI.

The control information may indicate that all the information included in the first sDCI is included in the second sDCI. The control information may indicate that a default value is used for the information included in the first sDCI (and/or the second sDCI).

The UE 100 may determine not to monitor the sPDCCH region where the first sDCI is transmitted, if the UE 100 does not need to receive the first sDCI. For example, in response to the control information indicating that all the information included in the first sDCI are included in the second sDCI, the UE 100 determines not to monitor the sPDCCH region where the first sDCI is transmitted. In response to the indication that the default value is used for the information included in the first sDCI, the UE 100 may determine not to monitor the sPDCCH region where the first sDCI is transmitted. The UE 100 may determine not to monitor the sPDCCH region where the first sDCI is transmitted, in response to a fact that the information included in the first sDCI is information not necessary for communication of the UE 100.

Likewise, if the UE 100 does not need to receive the second sDCI, the UE 100 may determine not to monitor the sPDCCH region where the second sDCI is transmitted.

In step S320, the UE 100 controls the monitoring of the sPDCCH region according to a determination result (S430 in FIG. 17).

The UE 100 monitors the sPDCCH region determined to be monitored. The UE 100 omits the monitoring of the sPDCCH region determined not to be monitored. As a result, a monitoring load of the UE 100 can be reduced. The BS 200 may transmit other information (for example, the sPDSCH) in the sPDCCH region if the transmission of the sPDCCH is omitted. As a result, a utilization efficiency of the radio resource can be improved.

The UE 100 may monitor all the sPDCCH regions if the UE 100 does not receive the control information or fails to receive the control information.

As described above, the UE 100 can determine whether to monitor some sPDCCH regions. For example, if information indicating whether to monitor all the sPDCCH regions in one subframe is transmitted in the PDCCH region, the UE 100 monitors or does not monitor all the sPDCCH regions. In this case, if data to UE 100 suddenly occurs after passing through the PDCCH region, UE 100 cannot receive the data until the next subframe. Alternatively, for example, if transmitting only the data to the predetermined UE 100 in a plurality of sPDCCH regions in the first half of the subframe, the other UE 100 does not need to receive a plurality of sPDCCH regions in the first half of the subframe. The UE 100 according to the present embodiment is particularly effective in such a case because it is possible to determine whether to monitor some sPDCCH regions.

(B) Operation Pattern 2-2

Figure 19:
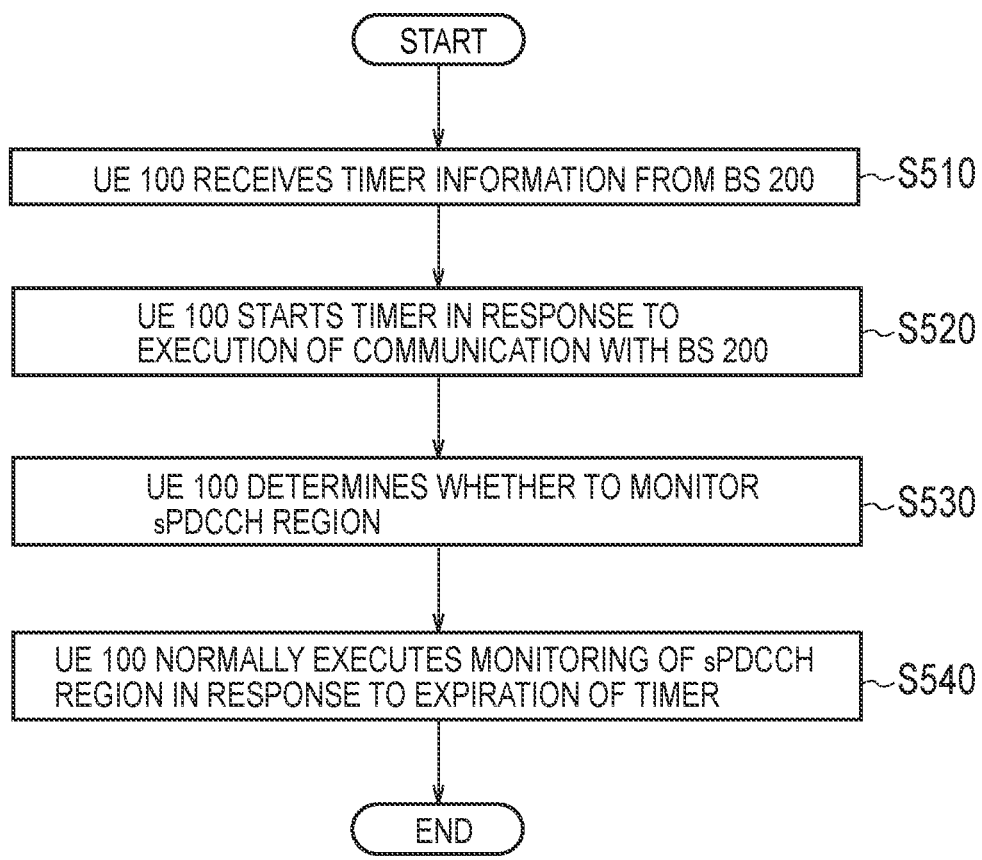
FIG. 19 is a flowchart for describing an operation (operation pattern 2-2) according to the second embodiment.

An operation pattern 2-2 will be described with reference to FIG. 19. FIG. 19 is a flowchart for describing the operation (operation pattern 2-2) according to the second embodiment. A content similar to the content described above will not be described.

The operation pattern 2-2 is a case where the UE 100 determines whether to monitor the sPDCCH region using a timer.

As illustrated in FIG. 19, in step S510, the UE 100 may receive timer information from the BS 200. The UE 100 may receive the timer information by dedicated signaling (for example, an RRC message (an RRC connection reestablishment message), DCI, or sDCI). The UE 100 may receive the timer information by broadcast signaling (for example, an SIB (System Information Block))/group cast signaling.

The timer information is information on a timer for determining whether to monitor a short control region. The timer information may indicate a timer value. The timer value may be set to the UE 100 in advance.

In step S520, the UE 100 starts a timer in response to execution of communication with the BS 200.

The UE 100 may start the timer in response to transmitting, to the BS 200, a scheduling request (SR) for requesting allocation of radio resources. The UE 100 may start the timer in response to transmitting information to the BS 200 over the sPUSCH in the sPUSCH region. The UE 100 may start the timer in response to receiving the information from the BS 200 over the sPDSCH in the sPDSCH region.

As a result of respective operations being executed, the UE 100 may execute respective timers associated with the respective operations. The timer values of the respective timers may be different. The timer values of the respective timers may be the same.

In step S530, the UE 100 determines whether to monitor the sPDCCH region.

The UE 100 may perform monitoring of the sPDCCH region while the timer is activated. The UE 100 may continue monitoring of the sPDCCH region until the timer expires. The UE 100 may end the monitoring of the sPDCCH region in response to expiration of the timer.

If the UE 100 transmits the SR to the BS 200, allocation of radio resources may be transmitted from the BS 200 over the sPDCCH. After transmitting the SR to the BS 200, the UE 100 can receive the allocation of radio resources by continuing the monitoring of the sPDCCH region. On the other hand, if the UE 100 cannot receive the allocation of radio resources even if the timer has expired, the UE 100 determines that the allocation of radio resources is not transmitted over the sPDCCH. As a result, the UE 100 can omit unnecessary monitoring of the sPDCCH region.

The UE 100 may end the timer if the UE 100 receives the allocation of radio resources before the timer expires. The UE 100 may end the monitoring of the sPDCCH region in response to the end of the timer.

If the UE 100 transmits information to the BS 200 over the sPUSCH, the delivery confirmation information of the information may be transmitted from the BS 200. After transmitting the information to the BS 200 over the sPUSCH, the UE 100 can receive the delivery confirmation information by continuing the monitoring of the sPDCCH region. On the other hand, if the UE 100 cannot receive the delivery confirmation information even if the timer has expired, the UE 100 determines that the delivery confirmation information is not transmitted over the sPDCCH. As a result, the UE 100 can omit unnecessary monitoring of the sPDCCH region.

The UE 100 may end the timer if the UE 100 receives the delivery confirmation information before the timer expires. The UE 100 may end the monitoring of the sPDCCH region in response to the end of the timer.

If the UE 100 receives information from the BS 200 over the sPDSCH, the information may be further transmitted from the BS 200 over the sPDSCH. After receiving the information from the BS 200 over the sPUSCH, the UE 100 can receive the information further transmitted over the sPDSCH by continuing the monitoring of the sPDCCH region. On the other hand, if the UE 100 cannot receive the information even if the timer has expired, it determines that the information is not transmitted over the sPDCCH. As a result, the UE 100 can omit unnecessary monitoring of the sPDCCH region.

The UE 100 may end the timer if the UE 100 completes reception of the information before the timer expires. The UE 100 may end the monitoring of the sPDCCH region in response to the end of the timer.

The UE 100 may continue the monitoring of the sPDCCH region until the timer expires, even if the UE 100 determines not to monitor the (partial) sPDCCH region, based on the control information in the operation pattern 2-1. This is because the transmission of the information in the sPDCCH region may be triggered by a communication operation of the UE 100. Thus, the UE 100 may prioritize the determination based on the timer over the determination based on the control information.

Even before the timer expires, the UE 100 may end the operation of continuously monitoring of the sPDCCH region, based on the control information in the operation pattern 2-1. For example, if the UE 100 receives the control information after the UE 100 executes the communication operation, the communication operation of the UE 100 may be highly possibly reflected in the control information. Thus, the UE 100 may prioritize the determination based on the control information over the determination based on the timer.

In step S540, the UE 100 normally executes the monitoring of the sPDCCH region in response to the expiration of the timer. For example, the UE 100 may execute the determination based on the control information.

Other Embodiments

The contents of the present application are described according to the above-described embodiment, but it should not be understood that the discussion and the drawings constituting a part of this disclosure limit the contents of the present application. From this disclosure, various alternative embodiments, examples, and operational technologies will become apparent to those skilled in the art.

In each of the above-described embodiments, although the PDCCH, the PDSCH, the PUCCH, and the PUSCH were mentioned as an example, these are not limiting. The above contents may be applied if a channel having a transmission time interval shorter than a predetermined channel is defined.

For example, the PDCCH may be replaced with at least one of the following channels:
Enhanced physical downlink control channel (EPDCCH: Enhanced physical downlink control channel)
Machine type communications physical downlink control channel (MPDCCH: MTC (Machine-Type Communications) physical downlink control channel)
Relay physical downlink control channel (R-PDCCH: Relay physical downlink control channel)
Narrowband physical downlink control channel (NPDCCH: Narrowband Physical downlink control channel)

For example, the PDSCH may be replaced by the following channel:
Narrowband physical downlink shared channel (NPDSCH: Narrowband Physical downlink shared channel)

For example, the PUSCH may be replaced by the following channel:
Narrowband physical uplink shared channel (NPUSCH: Narrowband Physical uplink shared channel)

The contents (each of the operation patterns) according to each of the embodiments described above may be combined and executed, where appropriate. In each of the above-described sequences, all of the operations may not necessarily be an essential configuration. For example, in each of the sequences, only some of the operations may be executed.

Although not particularly mentioned in each of the above-described embodiments, a program for causing a computer to execute each process to be performed by any one of the above-described nodes (such as the UE 100 and the BS 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium is not particularly limited; the non-transitory recording medium may include a recording medium such as a CD-ROM or a DVD-ROM, for example.

A chip may be provided which includes: a memory for storing a program for performing each process to be performed by either the UE 100 or the BS 200; and a processor for executing the program stored in the memory.

In each of the above-described embodiments, an LTE system is described as an example of the mobile communication system; however, the LTE system is not an exclusive example, and the contents according to the present application may be applied to a system other than the LTE system.

For example, the contents according to the present application may be applied to a communication system to be operated in 5G.

INDUSTRIAL APPLICABILITY

The present invention is useful in the field of mobile communication.

The invention claimed is:

1. A user equipment comprising:
a processor and a memory coupled to the processor, wherein the processor is configured to
receive a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe,
attempt to receive a second data transmitted on a second PDSCH in which a transmission time interval is one subframe,
transmit a second HARQ-ACK corresponding to the second data on the first time region,
receive, from the base station, second control information indicating whether bundling of the first HARQ-ACK and the second HARQ-ACK is permitted, and
transmit HARQ-ACK information obtained by bundling the first HARQ-ACK and the second HARQ-ACK on the first time region, when the second control information indicates that the bundling of the first HARQ-ACK and the second HARQ-ACK is permitted.

2. The user equipment according to claim 1, wherein
the first control information designates a first Physical Uplink Control Channel (PUCCH) in which a transmission time interval is shorten than one subframe used to transmit the first HARQ-ACK,
the processor is configured to transmit the second HARQ-ACK via the first PUCCH on the first time region.

3. A method used for a user equipment, comprising:
receiving a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe;
attempting to receive a second data transmitted on a second PDSCH in which a transmission time interval is one subframe;
transmitting a second HARQ-ACK corresponding to the second data on the first time region;
receiving, from the base station, second control information indicating whether bundling of the first HARQ-ACK and the second HARQ-ACK is permitted; and
transmitting HARQ-ACK information obtained by bundling the first HARQ-ACK and the second HARQ-ACK on the first time region, when the second control information indicates that the bundling of the first HARQ-ACK and the second HARQ-ACK is permitted.

4. An apparatus for controlling a user equipment, comprising:
a processor and a memory coupled to the processor, wherein the processor is configured to execute processes of:
receiving a first control information from a base station, the first control information designating a first time region on which a first Hybrid Automatic Repeat Request-Acknowledgement (HARQ-ACK) to be transmitted, the first HARQ-ACK corresponding to a first data transmitted on a first Physical Downlink Shared Channel (PDSCH) in which a transmission time interval is shorten than one subframe, the first time region being shorten than one subframe;
attempting to receive a second data transmitted on a second PDSCH in which a transmission time interval is one subframe;
transmitting a second HARQ-ACK corresponding to the second data on the first time region;
receiving, from the base station, second control information indicating whether bundling of the first HARQ-ACK and the second HARQ-ACK is permitted; and
transmitting HARQ-ACK information obtained by bundling the first HARQ-ACK and the second HARQ-ACK on the first time region, when the second control information indicates that the bundling of the first HARQ-ACK and the second HARQ-ACK is permitted.

* * * * *